United States Patent [19]

Michikoshi et al.

[11] Patent Number: 5,388,171
[45] Date of Patent: Feb. 7, 1995

[54] SEMICONDUCTOR LASER MODULE

[75] Inventors: Hisato Michikoshi; Hiromi Nakanishi, both of Osaka, Japan

[73] Assignee: Sumitomo Electric Industries, Ltd., Osaka, Japan

[21] Appl. No.: 44,664

[22] Filed: Apr. 9, 1993

[30] Foreign Application Priority Data

Oct. 30, 1992 [JP] Japan .................. 4-316251

[51] Int. Cl.⁶ .............................................. G02B 6/32
[52] U.S. Cl. ...................................... 385/36; 385/88; 385/93; 385/94
[58] Field of Search .................. 385/33, 34, 35, 36, 385/37, 38, 39, 88, 89, 90, 91, 92, 93, 94; 372/36

[56] References Cited

U.S. PATENT DOCUMENTS

| 4,355,321 | 10/1982 | Yeats | 385/93 X |
| 5,074,682 | 12/1991 | Uno et al. | 385/93 |

FOREIGN PATENT DOCUMENTS

| 5665677 | 10/1979 | Japan . |
| 281008 | 3/1990 | Japan . |
| 345913 | 2/1991 | Japan . |

Primary Examiner—John D. Lee
Assistant Examiner—Phan Thi Heartney
Attorney, Agent, or Firm—Cushman Darby & Cushman

[57] ABSTRACT

A semiconductor laser module is used for transmitting signals by optical fiber in optoelectronic communication. The module comprises a semiconductor laser, a lens, a receptacle and a lens holder. Reflection beams at an end of a fiber must not return to the semiconductor laser. To deviate the reflection beams from the semiconductor, a key-shaped glass block is mounted in the receptacle in tight contact with the end of a fiber. Repetition of putting on and taking off ferrules contaminates the glass block. Adhesion of dust deteriorates the performance against noise induced in the laser by the return of the beam. To avoid the adhesion of dust to the surface of the transparent block, a key-shaped transparent block is inserted into an axial hole of the receptacle, separating from the block. A gap between the block and fiber prohibits dust from cohering to the block. The deviation of axes of the receptacle and lens holder is small enough. The assembly is easy. The coupling between the receptacle and lens holder has strong mechanical strength.

22 Claims, 8 Drawing Sheets (JPLO)2-81008

(JPLO)3-45913

FIG. 5 PRIOR ART (JPLO)2-81008

(JPLO)3-45913

FIG. 7 PRIOR ART PIGTAIL TYPE

SEMICONDUCTOR LASER MODULE

FIELD OF THE INVENTION

This invention relates to a light source for optoelectronic communication or measurements especially to a semiconductor laser module with easy coupling and decoupling between a laser and an optical fiber and with a complete suppression of reflected light to return to the laser.

BACKGROUND OF THE INVENTION

This application claims priority from Japanese Patent Application No. 316251/1992 filed Oct. 30, 1992, which is incorporated herein by reference.

A semiconductor laser module is a small, multipurpose light source comprising a semiconductor laser, a lens and a receptacle into which a ferrule holding an end of an optical fiber can be inserted or from which it can be plucked easily. In general, a semiconductor laser module has a wide scope of utility for a light source of optoelectronic communication or measurements using optical fibers for transmitting media. In a semiconductor laser module, laser beams are converged on an end of an optical fiber by a lens. Most of the beams enter the optical fiber. But some part of the beams is reflected at the end of the optical fiber. The light reflected at the front end of an optical fiber is called near end reflection light. Since a semiconductor laser synchronously amplifies light power by reflecting light repeatedly by resonator mirrors at both ends of the chip, returning of the near end reflection light will cause instability in the oscillation action of the laser. The instability due to the return of the reflection light is an inherent weak point of a semiconductor laser which depends on induced emission of light. Various improvements have been devised in order to prevent reflection light from returning to the laser.

An easy solution is to shear an end of the fiber obliquely in order to keep reflection light from returning to the laser. FIG. 7 exhibits a prior pig tail type module with an improvement of forbidding reflection light returning into the laser. The module has a semiconductor laser (1), a lens (2), a ferrule (4) holding an end of an optical fiber (3) and a ferrule holder which fixes them everlastingly. Namely, the ferrule (4) can not separate from the holder in usual use. The near end reflection light does not, return to the semiconductor laser (1), because the front end of the fiber has been obliquely sheared and the reflection light deviates from the laser at twice the oblique angle of the end. Although the module is simple from the standpoint of optics, it is rather complex from the standpoint of assembly or construction. In general, an end of an optical fiber is cut and polished perpendicular to the axial line. Such a perpendicular cut fiber cannot be directly connected to a semiconductor. Therefore, the module has another connector besides the ferrule holder keeping the semiconductor laser, lens, and the ferrule. The connector terminates the other end of the optical fiber whose front end is fixed by the ferrule and front surface has been obliquely sheared. Any optical fiber having a ferrule can freely be coupled or decoupled to the rear connector. The optical fiber for transmitting optical signals has a perpendicularly cut end. The module requires an intermediate fiber (3) between the ferrule holder and the extra connector. Since the intermediate fiber looks like a tail of a pig, this type module is called "a pig tail type".

A pig tail module needs the intermediate fiber for coupling the laser and an optical fiber. As it includes double connections, material costs and assembly costs have piled up because of an excess of parts, e.g. an extra connector and a ferrule.

Some improvements have been proposed to avoid such double connections of pig tail type. One is a module to which a ferrule having a perpendicular cut fiber end can be attached or removed directly. It dispenses with an intermediate fiber, a connector and a ferrule. The ferrule of the external fiber can be directly inserted into a hole of a receptacle. Since the front end of the fiber has been cut perpendicular to the axial line of the fiber, the reflection from the front surface of the fiber end goes back to the semiconductor laser along the axial line. Two kinds of devices have been proposed in order to avoid returning of the reflection to the laser.

One improvement is to provide a key-shaped transparent block in front of a semiconductor laser. The other improvement is to incline a beam axis from the central optical axis. The prior improvements will be explained in more detail.

[1. key-shaped transparent block]

Japanese Patent Laying Open No.2-81008 (81008/1990) has proposed an improvement by a key-shaped transparent block for prohibiting the reflection light from returning to a semiconductor laser. FIG. 3 shows a schematic view. FIG. 5 exhibits a concrete module. The light beams emitted from a semiconductor laser (1) are converged by an lens (2) to a front end of a optical fiber (3). A key-shaped glass block (5) is disposed in front of a ferrule (4) holding the end of the fiber (3). In practice, the key-shaped glass block (5) is fixed at a front surface of a receptacle (6) with an axial hole for keeping the ferrule (4). The ferrule (4) can be put into the axial hole and taken off from the hole. In the state that the axial hole is pierced by the ferrule, the front end of a fiber is in contact with the key-shaped glass block (5). As the outer surface of the key-shaped glass block inclines to the optical axis of the fiber, the beams from the semiconductor laser (1) are refracted by the block (5) and enter the fiber (3). The incident beams are slightly slanting to the optical axis. But the inclination is less than the aperture angle of the optical fiber. The incident beams can be converted to propagating beams in the fiber (3). The aperture means a light cone in which the beams going out of a fiber end spread. Reversely, any beams within the aperture (light cone) can enter a fiber as propagating beams. The aperture angle is determined by the refractive indices of the core and cladding.

The glass block (5) is in tight contact with the fiber (3). If the refractive index of the glass is equal to that of the fiber, no reflection occurs at the boundary between the glass and the fiber. The tight contact is a necessary condition for no reflection. Of course, other reflection at the outer surface of the glass block (5) does occur as shown by a dotted line in FIG. 3. However, this reflection does not return to the semiconductor laser, because the reflection deviates from the optical axis between the laser and the fiber. Thus, the reflection from the outer surface of the block brings about no bad influence upon the stability of the laser oscillation.

The function has been clarified. The practical structure of the improvement will be explained by FIG. 5. In the figure, a semiconductor laser chip (1) fitted on a mount is encapsulated in a semiconductor laser package (9). A spherical lens (2) is fixed in an axial bore perforated through a lens holder (8). The semiconductor laser package (9) is equipped to a front end of the axial bore of the lens holder (8). A receptacle (6) has an axial hole and a flange. A ferrule with a fiber end can be attached in the axial hole and removed from it. The fiber end has been cut and polished perpendicular to the optical axis. In some cases, it may be polished round. The axial hole is stepwise widened near the flange. A step (18) is formed at the transition of the diameter of the hole. A key-shaped glass block (5) is held by a cylindrical stopper (7). The stopper (7) is inserted into the larger hole from the flange side. Then, the stopper (7) contacts with the step (18). The stopper (7) is fixed there. One end of the glass block is obliquely polished. The other end of the glass block is perpendicularly polished in order to couple to a fiber end without a gap therebetween. At the ferrule side, the surfaces of the stopper (7) and the block (5) are coincident with each other in a plane. When the ferrule keeping the end of a fiber is inserted into the axial hole, the front end of the fiber comes into tight contact with the glass block (5). The lens holder (8) is welded to the flange side of the receptacle (6).

[2. inclining beam axis]

For example, Japanese Patent Laying Open No. 3-45913 (45913/1991) has proposed an improvement utilizing an inclining beam axis. FIG. 4 shows the principle of the improvement. FIG. 6 demonstrates a concrete module. The beam line drawn from a semiconductor laser (1) to a center of a fiber end via a lens (2) inclines to the optical axis of the fiber (3). Namely, the laser (1) and the lens (2) are not aligned along an extension of the axial line of the fiber (3). The beams obliquely enter the end of the fiber within the aperture cone. Some part of the beams is reflected at the end surface as shown by a dotted line in FIG. 4. But the reflection does not return to the laser (1), because the incident angle is not a right angle. In FIG. 4, the laser (1), lens (2) and the center of the fiber end lie on a straight line (m). Line (m) is not the same as fiber axial line (n). Line (m) and line (n) cross each other at the center of the fiber end.

Namely, a first optical axis (m) determined by the laser (1) and lens (2) is slightly inclined to a second optical axis (n) determined by the fiber (3). The inclination of axes is important. The inclination prohibits the near end reflection light from returning to the semiconductor laser.

The near end of the fiber is protected by a ferrule (4) having a cylindrical shape. The ferrule can be put into an axial hole of a receptacle (6) and can be removed from the axial hole. The end of the fiber has been polished flat or slightly round perpendicular to the axial line. Light beams emitted from the laser (1) are converged by the lens (2) and enter the fiber (3). The inclination angle between line (m) and line (n) is less than the aperture angle. The beams entering the fiber can be converted into a propagating mode in the fiber. The incident beams may be slightly weaker than the perpendicular incidence beams.

What is important is where the reflection light goes. Since optical axes ( m ) and ( n ) are slightly slanted, the reflection light does not return to the laser (1). Practical module is demonstrated by FIG. 6. A lens (2) is fixed in an axial bore of a lens holder (8). A receptacle (6) has a flange and an axial hole with a step (18). A cylindrical stopper (7) is fixed in the axial hole of the receptacle (6). When a ferrule is inserted into the axial hole, the stopper (7) determines the position of the ferrule. The laser chip (1) is airtightly sealed by a semiconductor laser package (9). The lens holder (8) is welded at a pertinent eccentric position on the flange of the receptacle (6). The laser package (9) is adjusted in order to accomplish an optimum coupling to a fiber (3) and is welded at the position on the end surface of the lens holder (8).

This improvement can feature a crossing of optical axes. But Japanese Patent Laying Open No. 3-45913 has defined the improvement by a reverse eccentricity of optical axes of laser and receptacle with regard to the axis of lens. The beams converged by the lens enter the fiber slantingly to the fiber axis. The near end reflection light goes back to other direction deviated from the laser.

Prior laser modules for solving the difficulty of the near end reflection light have been explained so far. The pig tail type which forbids the reflection returning to a laser by oblique shearing of fiber end has the drawbacks of manifold parts and high assembly costs. Two improvements which had devised to conquer the drawbacks also have disadvantages.

[1. disadvantage of the key-shaped transparent block type]

Such an improved module with a key-shaped transparent block has a difficulty of a growing gap between a block and a fiber end. If attaching and removing of ferrules are repeated many times, the front end of ferrules does not come in tight contact with the glass block. Some clearance occurs between them. The clearance incurs an increase of reflection noises and an abasement of modulation performance of signals. The tight contact of a ferrule with a glass block is an important requirement for removing reflection at the surfaces of a fiber and block as mentioned before. The modules of ill-function were investigated by the Inventors for seeking the reason of malfunction. The Inventors discovered that some foreign matter adhered to the glass block. The foreign matter was sandwiched by the ferrule and block. The tight contact of the ferrule with the glass block was disturbed by the foreign matter. Then, the reflection at the surfaces increased. Analysis taught the Inventors that the foreign matter was the material of receptacle or cotton flakes for cleaning ferrules or receptacles.

The foreign matter could not easily be removed, because it adheres to the glass block by the strong force applied on ferrules. Since semiconductor laser modules are used in optoelectronic communication system as industrial products, it is inevitable that frequent repetitions of putting on or taking off the ferrule would induce abrasion of a receptacle and intake of dust by ferrules. The glass block is placed at the bottom of the axial hole of a receptacle. It is difficult to get rid of the foreign matter from the surface of the glass block.

Thus, the improvement of the key-shaped transparent type has a drawback that it is difficult to keep a tight contact between the ferrule and block which is indispensable for ensuring the reliability of the module owing to adhesion of dust to the glass block.

[2. disadvantage of the inclining optical axis]

The improvement of the inclining optical axis has also a drawback that it is difficult to adjust the relative position of a laser, lens and ferrule, because they must align on a line inclining to the central axis of the lens holder or the receptacle. Namely, the positions of the laser must be eccentric to the axial bore of the lens holder. The receptacle must be eccentric to the lens holder. FIG. 4 and FIG. 6 show eccentric dispositions of the receptacle (6) to the lens holder (8) and of the laser package (9) to the lens holder (8). The laser (1) and the receptacle (6) deviate from reciprocal direction with regard to the optical axis of the bore of the lens holder (8). The eccentricity decides the incident angle of beams to the optical fiber (3). In this case, the incident angle is not 0 degree unlike in ordinary modules. If the incident angle to the fiber were too large, the coupling loss between the fiber and the laser would Increase. On the contrary, if the incident angle were too small, the near end reflection light would return to the laser and cause instability to the laser oscillation. Therefore, the incident angle of beams to a fiber must be rigorously determined at a definite angle which is neither too large nor too small. The eccentricity must be rigorously decided with precision.

Experiments taught the Inventors that ±50 μm of error of deviation would induce ±1 dB of fluctuation of the coupling efficiency between a laser and a fiber under the conditions of 3 mm of the distance between a fiber and a lens and 5 degrees of the slanting incident angle. The conditions that the distance is 3 mm and the incident angle is 5 degrees are general in this type modules. But ±1 dB of the coupling efficiency is not so small fluctuation as can be neglected.

In an actual assembly, it is difficult to fix a lens holder eccentric to a receptacle and a laser package eccentric to a lens holder within tens of micrometers of tolerance. The assembly would invite incompatibility among assembly time, yield, and performance. Namely, it would take a long time to assemble the modules of high performance with high yield. Otherwise, if we tried to assemble the products in a short time, the performance would degenerate.

Furthermore, in the modules of inclining axis type, the coupling between a receptacle and a lens holder will incur asymmetric region of welding. In FIG. 6, the upper side of a welding region is much wider than that of the lower side. Such imbalance will deeply impair the strength of welding. Thus, the defaults of the inclining optical axis type are the difficulty of assembly and the mechanical fragility.

One purpose of this invention is to provide a semiconductor laser module immune from the defaults of prior ones. Namely, the semiconductor laser module of this invention is easy to assemble. The mechanical strength is sufficient. The fluctuation of performance is little. Frequent repetitions of putting on and taking off ferrules incur no decline in performance. In short, the laser module of this invention excels in reliability and cost.

SUMMARY OF THE INVENTION

The semiconductor laser module of this invention comprises a semiconductor laser, a lens for converging light beams emitted from the semiconductor laser to an optical fiber, a receptacle for holding a ferrule on an end of an optical fiber, and a transparent block with imparallel surfaces disposed between the lens and the ferrule with a gap before the ferrule for prohibiting the reflection light from the surface of the fiber end from returning to the laser.

This invention is akin to the key-shaped block type with regard to the use of an asymmetric transparent block. But it differs from the prior art on the gap provided between the glass block and fiber.

In the semiconductor laser module, the beams emitted from the laser are converged by the lens, pass through the asymmetric transparent block, are refracted and enter an end of the fiber with slanting incidence. The gap between the block and fiber lets the surfaces of the block and the fiber reflect the beams. Because of the slanting incidence, the reflection deviates from the optical axis in the direction reverse to the incident beams. The reflection beams draw a different path. It does not return to the laser. The laser is safely protected by the block from the reflection noise. Instability of oscillation of laser can be avoided by the transparent block in this invention. The improvement is derived from the fact that the reflection beams do not return to the laser as the incident beams enter the fiber end obliquely with non-zero angle. The rear surface of the block also reflects the beams. But the surface also inclines to the beams. The reflection light does not go back to the laser.

The module keeps the block separate from fiber ends. A gap remains between the block and fiber end in the state of coupling. The repetition of putting on and taking off ferrules does not incur contamination of the block by dust, e.g. cotton flakes, metal powder, etc. Of course, there is some dust in the axial hole. But the dust does not adhere to the block, because it is not pressed to the block by a ferrule. The gap prevents the dust from adhering to the block. The tight contact of ferrules to the glass block forces the dust into adhering to the block in the prior improvement of key-shaped block type. On the contrary, this invention allows the dust to be free in the gap. The block is not contaminated by the dust, even if some dust is produced by abrasion of receptacle or is inhaled from the external space.

The other advantage is easy assembly without eccentric welding which requires high precision. The incident angle of beams to the fiber is determined by the refractive index of the transparent block and the inclination angle between the front surface and the rear surface of the block. A first optical axis (m) drawn from the laser to the lens slightly deviates from a second optical axis (n) of the fiber axis. But the deviation Δ is small enough. The lens holder can align with the receptacle nearly coaxially. The coaxial welding ensures mechanical strength of the coupling between the receptacle and the lens holder.

Advantages of the invention will now be explained. This invention provides a transparent block with imparallel surfaces between a lens and ferrule with a gap in order to prevent the reflection beams from entering the laser. Although the forward path and backward path are different in order to eliminate the possibility of entry to the laser of the backward beams, the laser, lens and fiber can be aligned nearly in a straight line with only a small deviation. The alignment of the receptacle, laser package and lens holder alleviates the difficulty of welding. The gap between the block and ferrule prevents the dust there from cohering to the block in spite of many of repetitions of putting on and taking off ferrules. No adhesion of dust to the block keeps the performance of the module in an optimum state. The instability is not induced even by long-term use with frequent repetitions of putting on and off of ferrules. The stability of laser diode heightens the reliability of the module. The structural feature that a laser, lens holder and receptacle can be aligned nearly along a straight line enables us to assemble them easily, because the adjustment and welding become simple. The strength of welding is also reinforced by symmetric welding unlike the prior art shown by FIG. 6. Thus, this invention excels in performance, reliability and manufacturing of semiconductor laser modules.

DETAILED DESCRIPTION OF THE PREFERRED EMBODIMENTS

Figure 1:
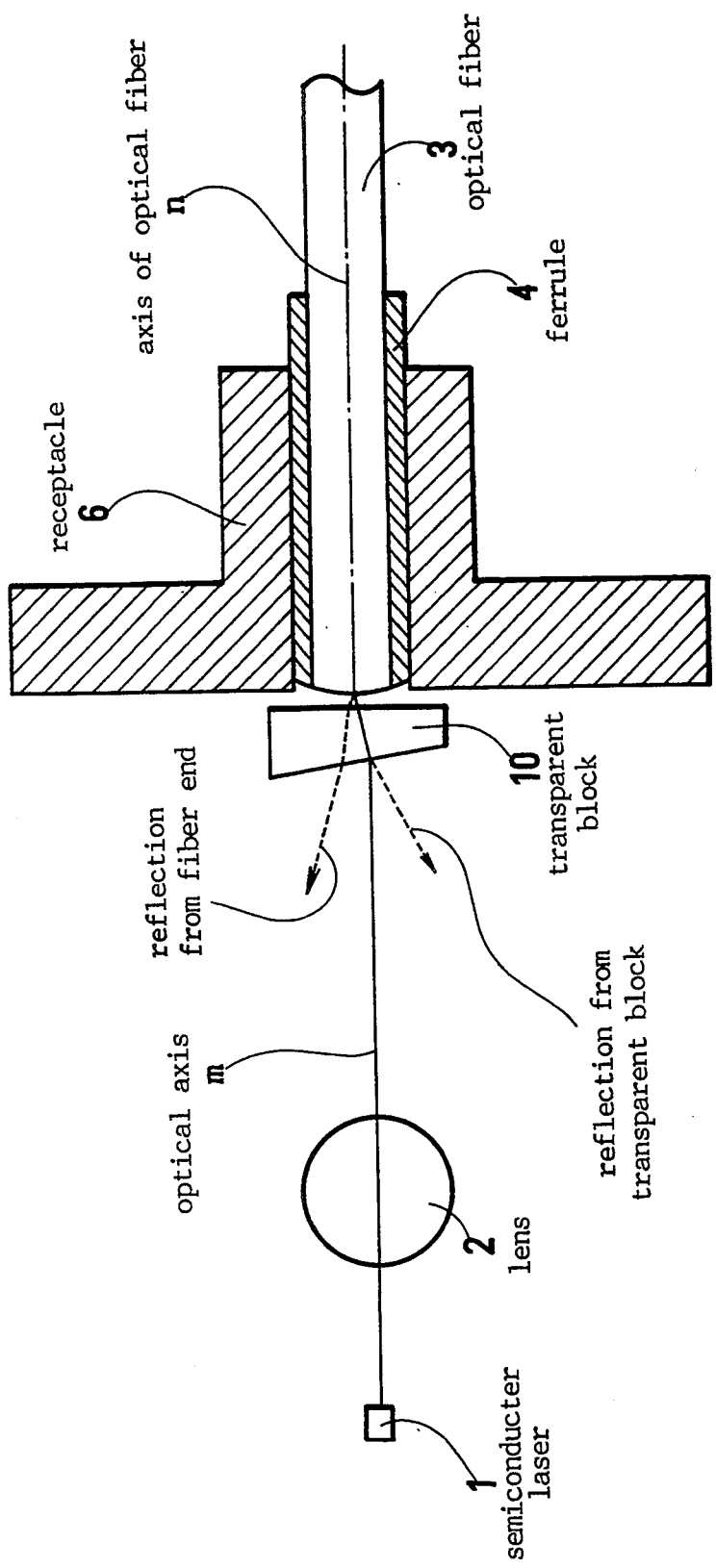
FIG. 1 is a schematic view of a semiconductor laser module of this invention.

In FIG. 1, a semiconductor laser (1), a lens (2) and an optical fiber (3) are aligned nearly along a straight line. The laser (1) emits light beams for transmitting digital or analog signals. The lens (2) converges the beams on a central point of the fiber end. A ferrule (4) terminates the fiber end. The end of fiber (3) is polished slightly round perpendicular to the axial line (n) of the fiber. A receptacle (6) has an axial hole in which ferrules can be held. A transparent glass block (10) is mounted between the lens (2) and the ferrule (4). The glass block (10) is separated from the fiber end. There is a gap therebetween. The transparent glass block has a front surface facing the lens and a rear surface facing the ferrule. The front surface is imparallel to the rear surface. Thus, beams are refracted by the transparent block (10). The beams obliquely go into the fiber. First optical axis (m) drawing from the laser (1) to the lens (2) slightly deviates from second optical axis (n) of the fiber in the direction perpendicular to them, although they are parallel. The deviation $\Delta$ is determined by the thickness D of the transparent block (10), the inclination angle $\Theta$, refractive index N, and clearance d. But $\Delta$ is a short distance.

In the semiconductor laser module, the beams emitted from the laser (1) are converged by the lens (2), refracted by the transparent block with the imparallel surfaces and slantingly collide with the end of the fiber. Some part of the beams reflects at the fiber end. But the reflection beams go back along a different path shown by a dotted line, since the incident angle is not a right angle. Another reflection beams from the front surface of the block (10) goes back along another path also different from the forward going beams, as shown by another dotted line. The number of times and points of reflection increases in comparison to prior one demonstrated by FIG. 3. However, the reflection noise is alleviated, because no reflection beams return to the semiconductor laser. The module of this invention is free from gradual degradation of modulation performance depending on the instability induced by reflection noise of the laser.

Figure 2:
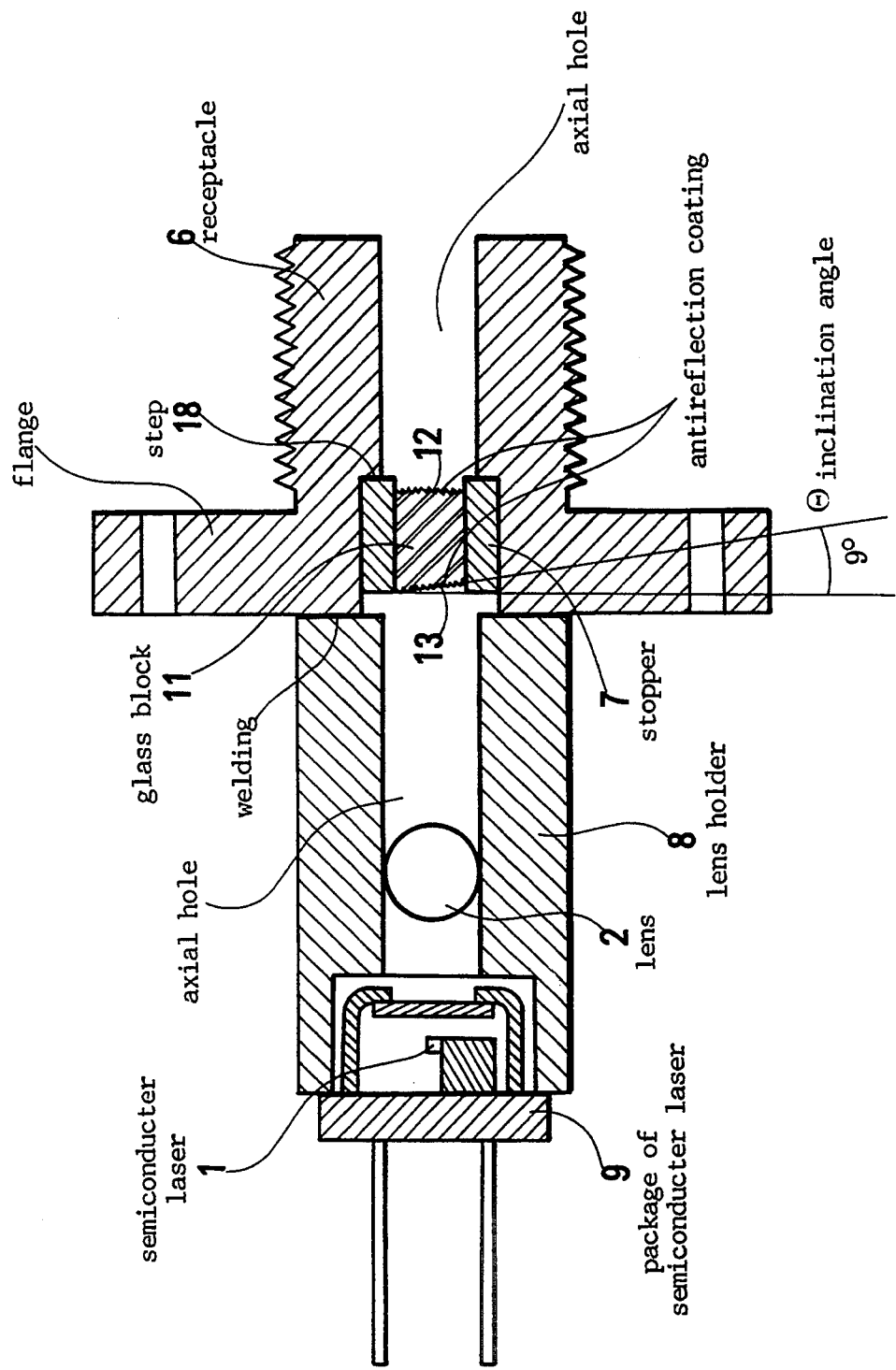
FIG. 2 is a sectional view of an embodiment of this invention.

An embodiment of the semiconductor laser module of this invention will be now explained by FIG. 2. The module has a receptacle (6) which is a metallic part comprising a flange, an axial hole and a male screw part. The receptacle (6) can also be made from plastics. The axial hole has a smaller hole part and a larger hole part. The boundary becomes a step (18). A cylindrical stopper (7) having a quartz glass block (11) is inserted into the larger hole part of the receptacle (6). The stopper is glued to the hole with resin adhesive. The quartz glass block (11) having imparallel surfaces polished like a key corresponds to the aforementioned transparent block (10). When a ferrule is put in the smaller hole part of the receptacle, the front surface (12) of the glass block (11) is separated from the ferrule and the fiber end held by the ferrule. The position of the glass block (11) in the stopper (7) is adjusted to produce a gap (d) between the block and fiber to be 0.2 mm (d=0.2 mm ). In general, the gap (d) shall be determined to be from 0.05 mm to 3 min. In this example, the rear surface (near a fiber, ferrule) of the glass block is polished perpendicular to the fiber axis (n) (or the axis (m) of a laser and lens). The front surface (13) (near a lens and laser) is polished in a slanting plane inclining at 9 degrees to the fiber axis (n) (or the axis (m)). Namely, $\Theta = 9°$. In general, $\Theta$ shall be 2° to 20°. Both surfaces (12) and (13) are provided with antireflection coating (as shown by wavy lines) for the wavelength of the laser oscillation. The wavy lines represent the antireflection coating thereon. The surfaces are smooth and flat, because they have been polished. They are not rugged surfaces at all. However, this module can dispense with the antireflection coating on the glass block.

The semiconductor laser fixed on a mount is sealed by a semiconductor package (9) at a center with regard to the base of the package. The lens (2) is fixed at a suitable position in the axial bore of a lens holder (8). The laser package (9) is welded at an opening end of the lens holder (8) at a pertinent position. The lens holder (8) is also spot-welded to the receptacle (6) by a YAG laser welder. In the example, the beams converged by the lens focus at a point in the glass block. Of course, it is also allowable to settle the focus just on the surface of a fiber. Furthermore, plastics or monocrystalline transparent materials can be employed as the key-shaped transparent block instead of the quartz glass block.

In the embodiment, the insertion loss owing to the glass block was 1 dB. This is a very small value, although the insertion loss includes the loss due to the slanting incidence, the loss in the glass block, and the reflection loss at the front surface and the rear surface. Addition of the glass block burdens the assembly of modules with no difficulty. The deviation of the laser-lens axis (m) from the fiber axis (n) differs the central line of the receptacle (6) from the central line of the lens holder ((8). However, the deviation is only 20 $\mu$m in the embodiment. The deviation is negligibly small. 100 repetitions of putting on and taking off a ferrule does not deteriorate the performance of the module.

Figure 8:
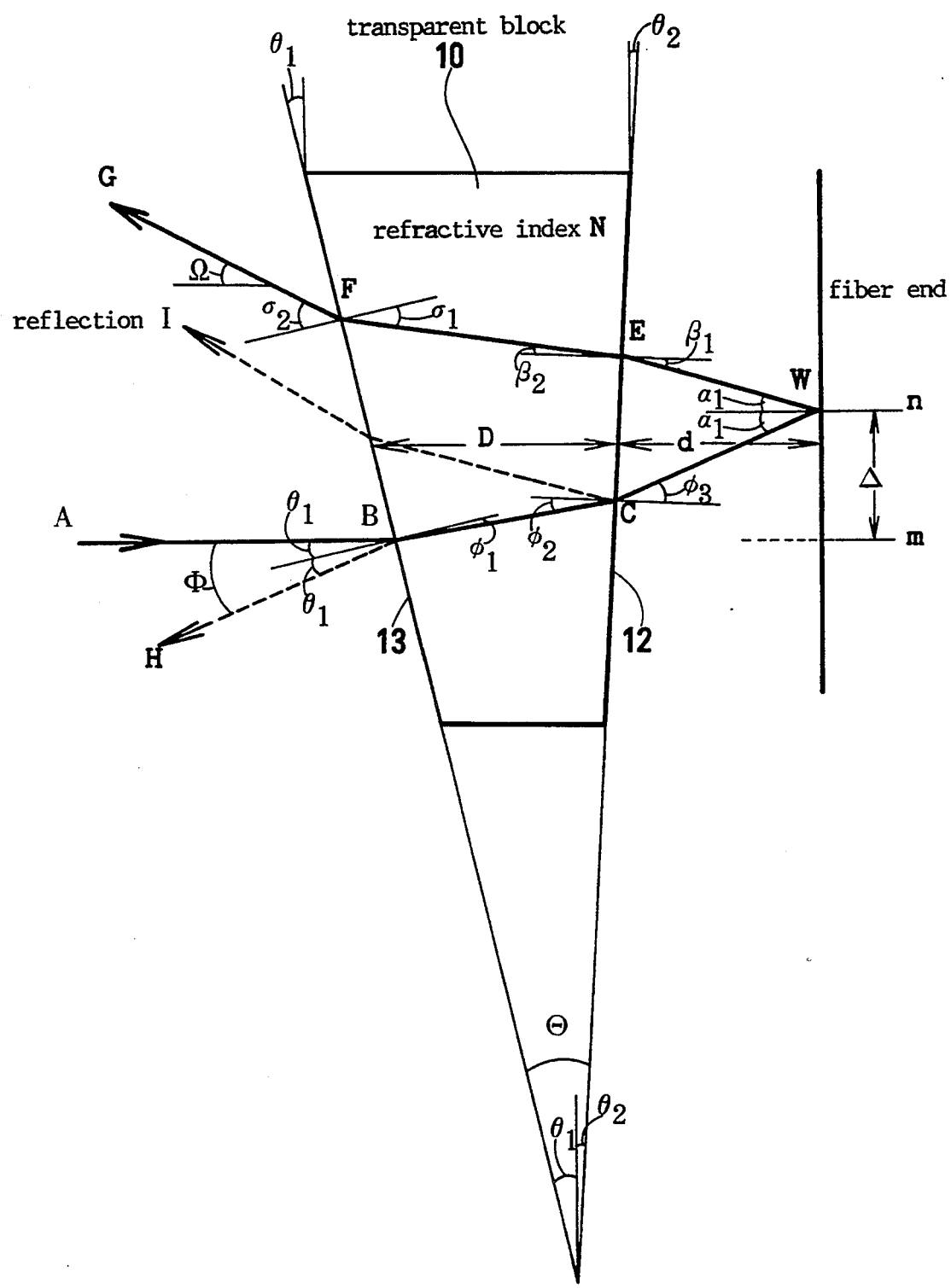
FIG. 8 is an explanatory view showing definitions of thickness and inclination angle of a transparent block, a gap between the block and fiber end as parameters for calculating the paths, angles deviations of beams.

FIG. 8 demonstrates the optical paths in a transparent block and a space before the fiber end, the angles of the paths and the deviation of the axes. The transparent block with imparallel surfaces is positioned before the fiber end with a gap of (d). The inclination angle between both surfaces is $\Theta$. The effective thickness of the transparent block is D. Both surfaces are not perpendicular to the optical axes. The front surface inclines at $\theta_1$ to the fiber end. The rear surface inclines at $\theta_2$ to the fiber end. Of course, $\theta_1 + \theta_2 = \Theta$. Although FIG. 1 and FIG. 2 show the special case of $\Theta_2 = 0$ by the way of example, the inclination angle can take an arbitrary value besides 0.

For simplicity a central beam which is emitted at the center of the laser and passes through the center of the lens shall be considered. The sample beam progresses from point (A) to point (B) on the transparent block (10). The sample beam is perpendicular to the end surface of the fiber. The incident angle at point (B) is $\theta_1$, as the front surface (13) inclines at $\theta_1$. The beam is refracted at point (B). The refraction angle is denoted by $\phi_1$. The incident angles, refraction angles or reflection angles are commonly defined as angles of deviation from the normals of the reference surfaces. A little part of the beam is reflected at (B) into the dotted line BH. The reflection angle is $\theta_1$. The main beam attains point (C) on the rear surface of the block (10). A little part of the beam is reflected at (C) as reflection beam (I) which regresses out of the block. The incident angle is $\phi_2$. The reflection angle of (I) is also $\phi_2$. Main part of the beam is refracted at (C). The refraction angle at (C) is $\phi_3$. The beam progresses in a free space and enters the end of a fiber at (W). The entering beam plays a role of transmitting signals. But the main, entering beam is not an object of this invention. Thus, the main beam will not be considered. At point (W), a little part of the beam is reflected. The incident angle and reflection angle are denoted by $\alpha_1$ in common. The reflected beam regresses in a free space into point (E) on the surface of the block. The incident angle is $\beta_1$ at (E). The beam is refracted at (E). The refraction angle is $\beta_2$. The beam further regresses in the medium to point (F). The incident angle is $\sigma_1$. The beam is refracted at (F) and goes out to a free space. The refraction angle is $\sigma_2$. The beam further regresses from (F) as the arrow FG. The inclination angle of the reflection beam FG to the initial forward going beam AB is denoted by $\Omega$. Besides GF, there is another reflection BH on the surface of the block. The inclination angle of the reflection BH to the initial beam AB is denoted by $\Phi$. Then $\Delta$ signifies the deviation of the axis (m) of a laser and lens from the axis (n) of the fiber. Therefore, the parameters which describe the optics of the module are an inclination angle $\Omega$ of the reflection at (W) on a fiber end, another inclination angle $\Phi$ of the other reflection at (B) on a block and a deviation $\Delta$ between the optical axes.

Under the assumption of a thin glass block and small inclination of the block, sine and tangent of an angle is assumed to be equal to the angle itself in the unit of radian. The following relations hold for reflection or refraction of beams at the reference points.

$$N\phi_1 = \theta_1 \quad (1)$$

$$\phi_1 + \phi_2 = \Theta = \theta_1 + \theta_2 \quad (2)$$

$$N\phi_2 = \phi_3 \quad (3)$$

$$\phi_3 - \theta_2 = \alpha_1 \quad (4)$$

$$\beta_1 + \theta_2 = \alpha_1 \quad (5)$$

$$N\beta_2 = \beta_1 \quad (6)$$

$$\Theta + \beta_2 = \sigma_1 \quad (7)$$

$$N\sigma_1 = \sigma_2 \quad (8)$$

$$\Omega = \sigma_2 - \theta_1 \quad (9)$$

$$\Phi = 2\theta_1 \quad (10)$$

Eq.(1), (3), (6) and (8) signify Snell's equation determining the relation between the incident angle and refraction angle. Other equations are given by the relations between inner angles and outer angles of triangles. Eq.(10) determines the reflection at the front surface of glass block. Under the assumptions, solution are, $$\phi_1 = \theta_1/N \quad (11)$$

$$\phi_2 = \theta_1(1 - N^{-1}) + \theta_2 \quad (12)$$

$$\phi_3 = \theta_1(N-1) + \theta_2 \quad (13)$$

$$\alpha_1 = (\theta_1 + \theta_2)(N-1) = \Theta(N-1) \quad (14)$$

$$\beta_1 = \theta_1(N-1) + \theta_2(N-2) \quad (15)$$

$$\beta_2 = \theta_1(1 - N^{-1}) + \theta_2(1 - 2N^{-1}) \quad (16)$$

$$\sigma_1 = \theta_1(2 - N^{-1}) + \theta_2(2 - 2N^{-1}) \quad (17)$$

$$\sigma_2 = \theta_1(2N - 1) + \theta_2(2N - 2) \quad (18)$$

$$\Omega = (\theta_1 + \theta_2)(2N - 2) = 2(N-1)\Theta \quad (19)$$

The reflection beam FG at the end of the fiber is designated by $\Omega$. The inclination $\Omega$ of beam FG is $2(N-1)\Theta$. For example, if the refractive index N is 1.5 and the inclination $\Theta$ of the block is 6°, the deviation $\Omega$ of beam FG is 6°.

The direction of the reflection beam BH depends on the direction of the transparent block. In order to prevent the reflection beams returning back to the semiconductor laser, any $\theta_1$ except $\theta_1 = 0$ is allowable. If $\Theta = 6°$ and e.g. $\theta_1 = 4°$ and $\theta_2 = 2°$, $\Phi = 8°$.

Thus, under the assumption of small inclination of the block (small $\Theta$), the reflection beam at the fiber end is determined only by the slanting angle $\Theta$ between the front and rear surfaces irrespective of the disposition of the transparent block, $\theta_1$ and $\theta_2$. On the contrary, the reflection at the forward surface of the block depends on the attitude of the block ($\theta_1$).

The thickness D of the transparent block shall be determined by the mechanical strength of the material and the diameter of the axial hole of the receptacle. In general, D=0.3 mm to 6 mm.

Whether $\theta_1 = 0$ is always forbidden or not will be now clarified. If $\theta_1 = 0$, the reflection at the fiber end returns to the laser. Thus, $\theta_1 \neq 0$ is desirable. However, in the case of $\theta_1 = \theta_2$, the intensity of the reflection at the block can be reduced weaker than that of the reflection at the fiber end by decreasing the refractive index of the transparent block lower than that of the fiber. The energy reflection rate R at a boundary is given by $$R = [|1 - N|/|1 + N|]^2 \quad (20)$$

where N is a refractive index of a medium in contact with vacuum (air) whose index is 1. If the refractive index of fiber is 1.4, R is about 0.08. This is the reflection loss at the fiber end. If the refractive index of the glass block is smaller than that of the fiber, the energy loss due to the reflection at the glass block is less than that at the fiber end. Therefore, if the transparent block has a refractive index smaller than that of the fiber (e.g. N=1.4 for quartz fiber), the case $\theta_1 = 0$ should not be prohibited. Furthermore, antireflection coating on the front surface of the transparent block allows us to adopt the condition $\theta_1 = 0$ safely.

Next, the deviation $\Delta$ between axes (m) and (n) will be calculated. The deviation is a sum of the deviation in the medium and the deviation in the free space.

$$\Delta = D(\theta_1 - \phi_1) + d\alpha_1 \quad (21)$$
$$= \{(D/N) + d\}(N - 1)\Theta \quad (22)$$

where D is the thickness of the key-shaped block and d is the gap between the rear surface of the block and the end of the fiber. The deviation will increase in proportion to the thickness D and the gap d. However, for a usual selection of parameters, $\Delta$ is small enough. For example, if D=1 mm, d=0.5 mm, N=1.4, and $\Theta$=5°, the deviation $\Delta$ is 0.09 mm. The deviation $\Delta$ is small. Thus, the discrepancy of central axes of a receptacle and lens holder is also small enough. Small gap d is more effective to abate the deviation $\Delta$. In order to abate d, it is suitable to place the block with the rear surface parallel with the end of the fiber ($\theta_2$=0). However, $\theta\neq 0$ is also allowable.

Non-parallelism of front and rear surfaces is one of important features of this invention. However, this restriction does not mean that both surfaces must be flat. Only small regions of surfaces in which light beams pass shall be flat.

Figure 4:
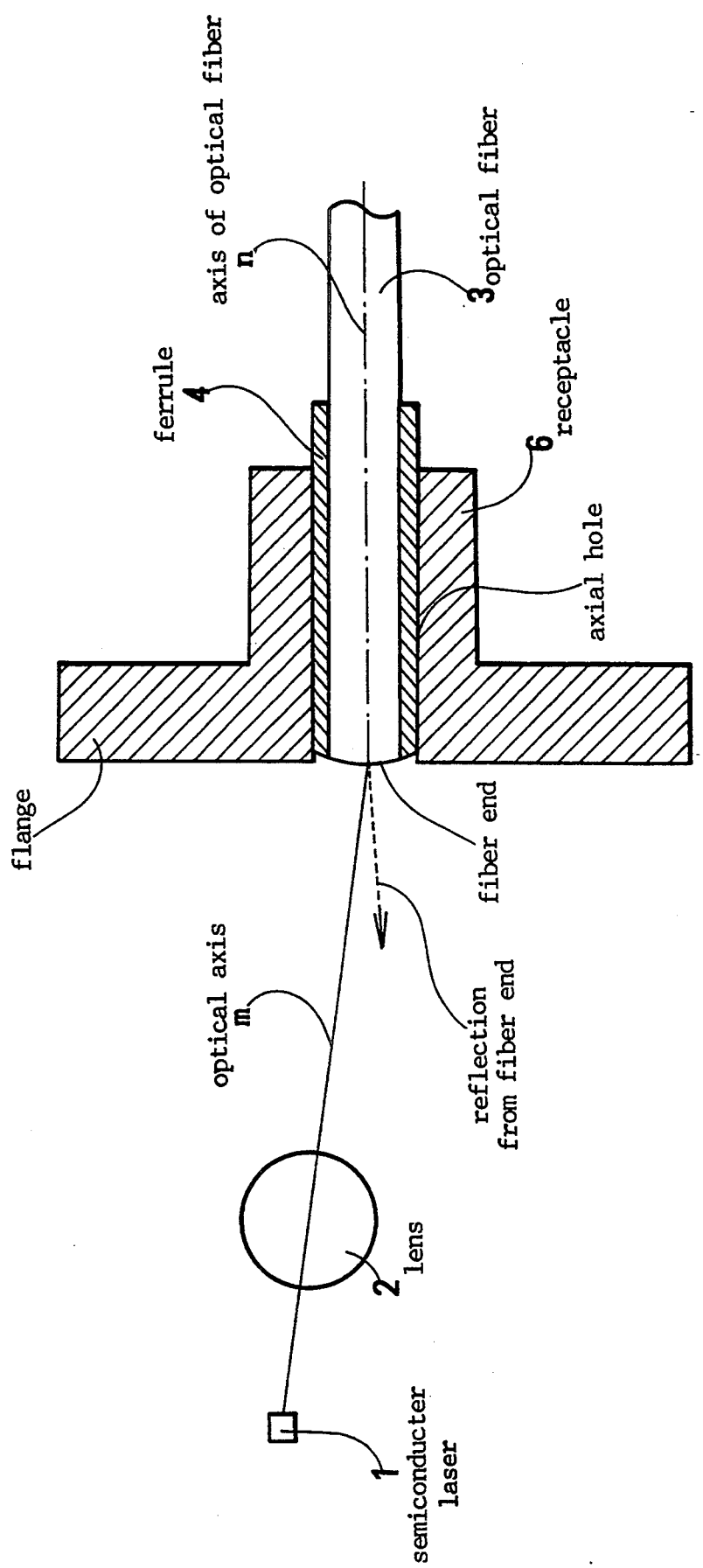
FIG. 4 is a schematic view of another prior semiconductor laser module of an inclining optical axis type.
Figure 6:
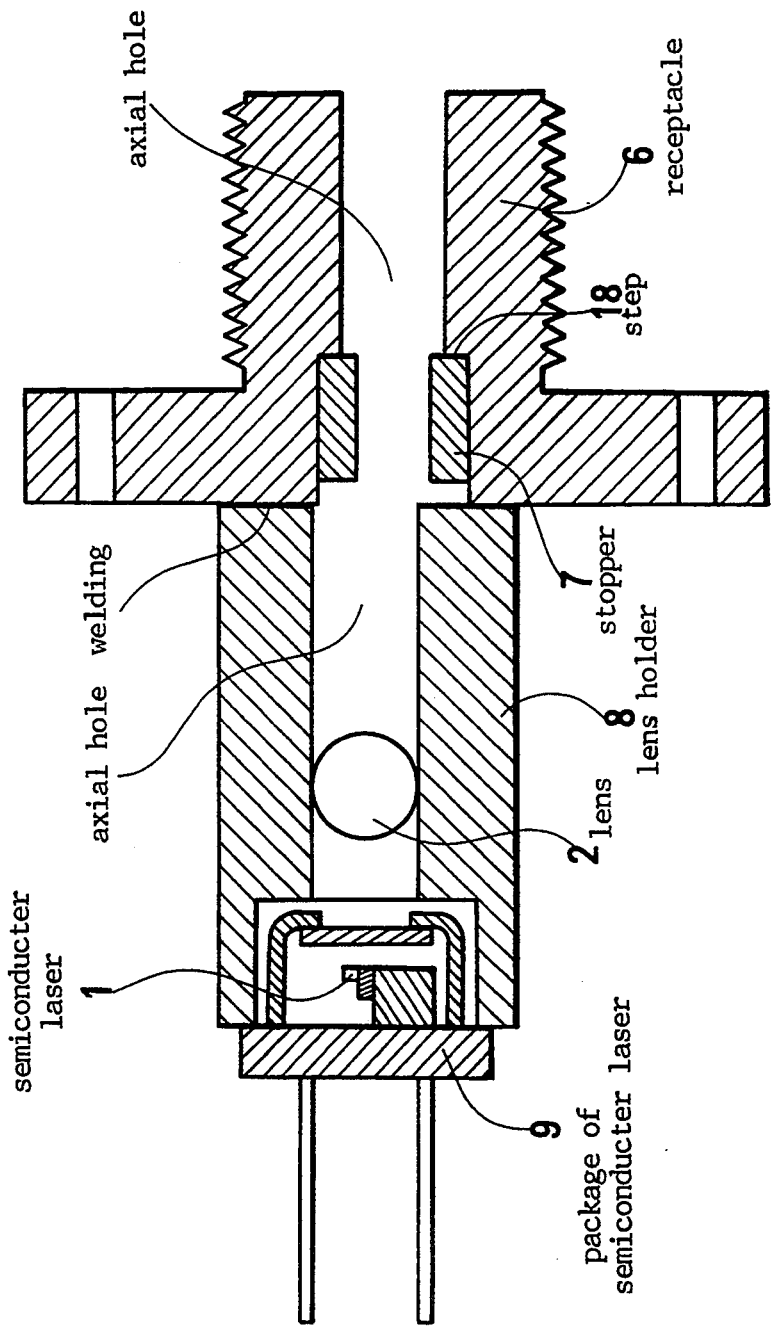
FIG. 6 is a sectional view of the prior module shown in FIG. 4 of inclining optical axis type.
Figure 7:
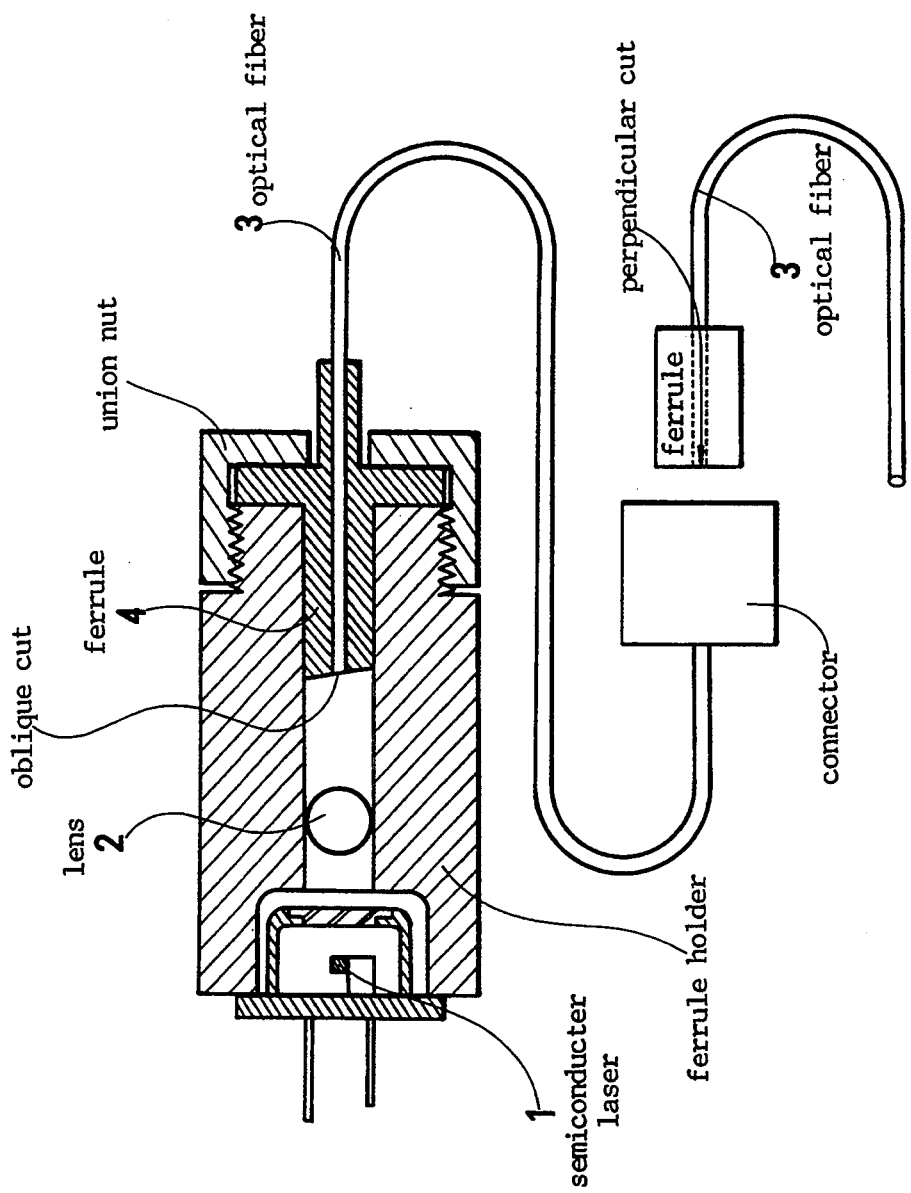
FIG. 7 is a sectional view of a prior semiconductor laser module of a pig tail type.

The prior inclining axis type shown by FIG.4 and FIG. 6 lets the incident angle at the fiber end differ from 0° by inclining the first optical axis (m) between a laser and an end of a fiber to the second axis (n) of the fiber. The incident angle is denoted by $\Theta$. The distance from the laser to the fiber end is denoted by L. The deviation $\Delta$ of axes (m) and (n) is a product L $\Theta$ of L and $\Theta$. $\Delta'$=L$\Theta$.

In order to obtain the same incident angle $\Theta$, the deviation $\Delta'$ would be $L/\{(D/N)+d\}(N-1)$ times larger than that of the invention. The multiplier is a large value. Since smaller deviation is more desirable to built a module with sufficient strength by easy adjustments, the smaller multiplier reveals the excellency of this invention.

The most important feature of this invention is the gap between the rear surface of the block and the end of a fiber. If cotton flakes, metal powder or other rubbish is introduced in the space between the block and the fiber, the dust is not pressed against the block. The dust adheres to the block. The distance between the block and the fiber end is kept constant despite long-term use. The dust can be eliminated easily, because they do not adhere to the block.

Figure 3:
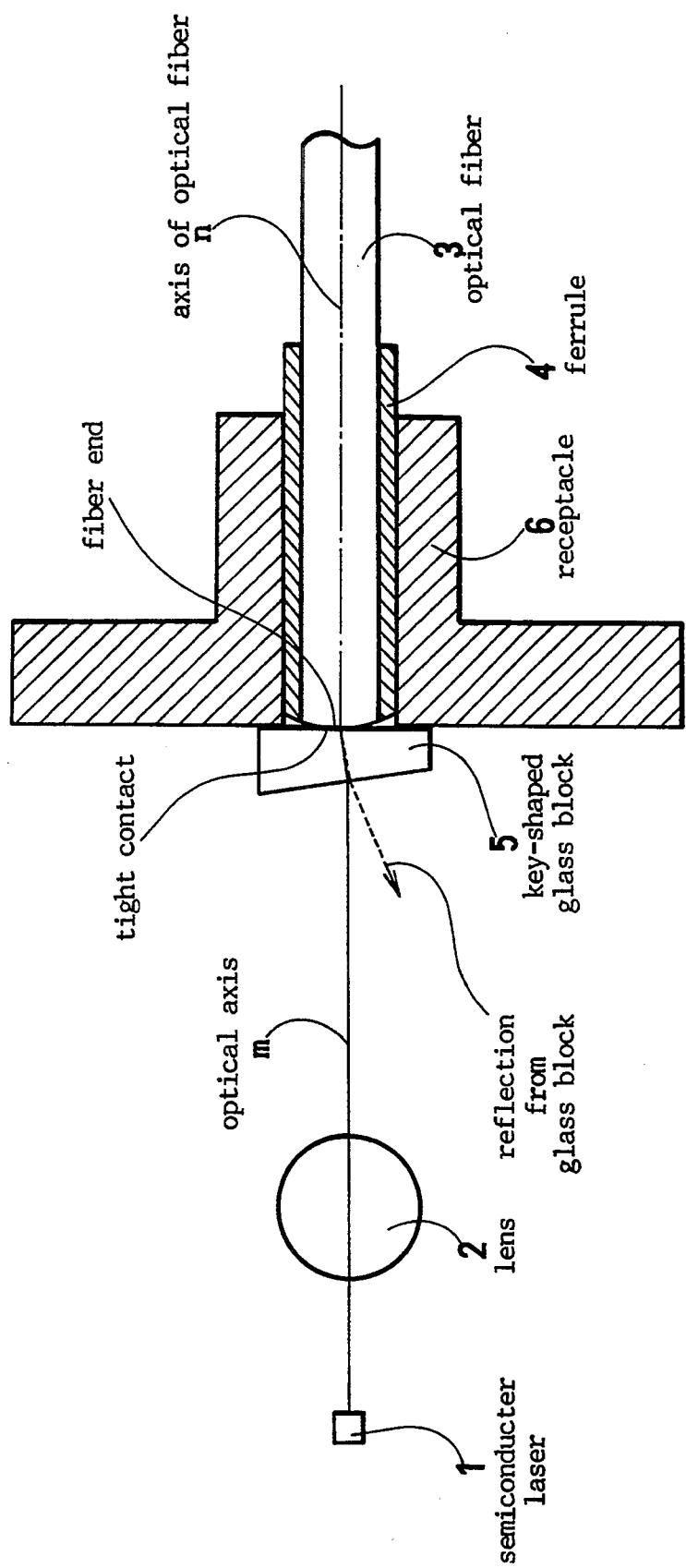
FIG. 3 is a schematic view of a prior semiconductor laser module of a key-shaped glass block type.
Figure 5:
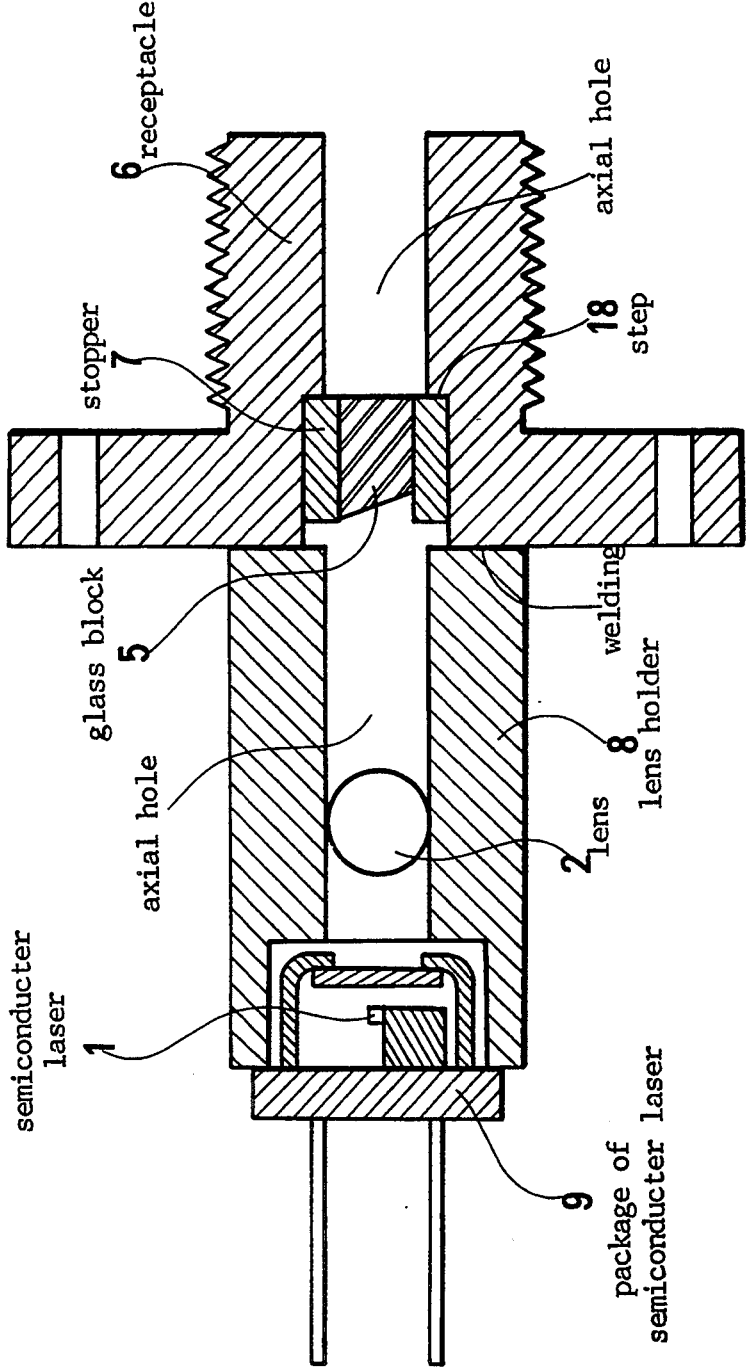
FIG. 5 is a sectional view of a prior laser module of a key-shaped glass block type.

However, this invention incurs an increase of reflection points in comparison with the prior one shown by FIG.3 or FIG. 5. Reflections at points B and C can be effectively avoided by the antireflection coating of the block. But the loss due to the reflection at point W is unavoidable.

What we claim is:

1. A semiconductor laser module comprising:
a semiconductor laser for emitting light beams;
a lens for converging the light beams;
a lens holder having an axial bore for keeping the lens in the axial bore and the semiconductor laser at an end of the axial bore;
a ferrule holding an end of an optical fiber;
a receptacle having an axial hole for supporting the ferrule, the receptacle being connected to the lens holder; and
a transparent block with imparallel front and rear surfaces fixed in the axial hole of the receptacle, the transparent block being separated from the end of the fiber.

2. A semiconductor laser module as claimed in claim 1, wherein a thickness D of the transparent block is approximately 0.3 mm to 6 mm, a gap d separating the transparent block from the end of the fiber is approximately 0.05 mm to 3 mm and an inclination angle held between the imparallel front and rear surfaces is approximately 2° to 20°.

3. A semiconductor laser module as claimed in claim 2, wherein the front surface of the transparent block has antireflection coating.

4. A semiconductor laser module as claimed in claim 2, wherein the rear surface of the transparent block has antireflection coating.

5. A semiconductor laser module as claimed in claim 2, wherein both the front and rear surfaces of the transparent block have antireflection coating.

6. A semiconductor laser module as claimed in claim 2, wherein the front surface of the transparent block does not coincide with a point at which the light beams are converged by the lens.

7. A semiconductor laser module as claimed in claim 2, wherein the rear surface of the transparent block does not coincide with a point at which the light beams are converged by the lens.

8. A semiconductor laser module as claimed in claim 2, wherein the front surface of the transparent block is not perpendicular to the axial line of the receptacle.

9. A semiconductor laser module as claimed in claim 1, wherein an inclination angle $\theta_1$ of the front surface of the transparent block to an axial line of the receptacle is larger than an inclination angle $\theta_2$ of the rear surface of the transparent block to an axial line of the receptacle.

10. A semiconductor laser module as claimed in claim 9, wherein the front surface of the transparent block has antireflection coating.

11. A semiconductor laser module as claimed in claim 9, wherein the rear surface of the transparent block has antireflection coating.

12. A semiconductor laser module as claimed in claim 9, wherein both the front and rear surfaces of the transparent block have antireflection coating.

13. A semiconductor laser module as claimed in claim 9, wherein the front surface of the transparent block does not coincide with a point at which the light beams are converged by the lens.

14. A semiconductor laser module as claimed in claim 9, wherein the rear surface of the transparent block does not coincide with a point at which the light beams are converged by the lens.

15. A semiconductor laser module as claimed in claim 9, wherein the front surface of the transparent block is not perpendicular to the axial line of the receptacle.

16. A semiconductor laser module as claimed in claim 1 wherein the front surface of the transparent block has antireflection coating.

17. A semiconductor laser module as claimed in claim 1, wherein the rear surface of the transparent block has antireflection coating.

18. A semiconductor laser module as claimed in claim 1, wherein both the front and rear surfaces of the transparent block have antireflection coating.

19. A semiconductor laser module as claimed in claim 1, wherein the front surface of the transparent block does not coincide with a point at which the light beams are converged by the lens.

20. A semiconductor laser module as claimed in claim 1, wherein the rear surface of the transparent block does not coincide with a point at which the light beams are converged by the lens.

21. A semiconductor laser module as claimed in claim 1, wherein the front surface of the transparent block is not perpendicular to the axial line of the receptacle.

22. A semiconductor laser module comprising:
a semiconductor laser for emitting light beams;
a lens for converging the light beams;
a lens holder having an axial bore for keeping the lens in the axial bore and the semiconductor laser at an end of the axial bore;
a ferrule holding an end of an optical fiber, the end of the fiber being substantially perpendicular to an optical axis of the fiber;
a receptacle having an axial hole for supporting the ferrule, the receptacle being connected to the lens holder; and
a transparent block with imparallel front and rear surfaces fixed in the axial hole of the receptacle, the transparent block being separated from the end of the fiber.

* * * * *